UNITED STATES PATENT OFFICE.

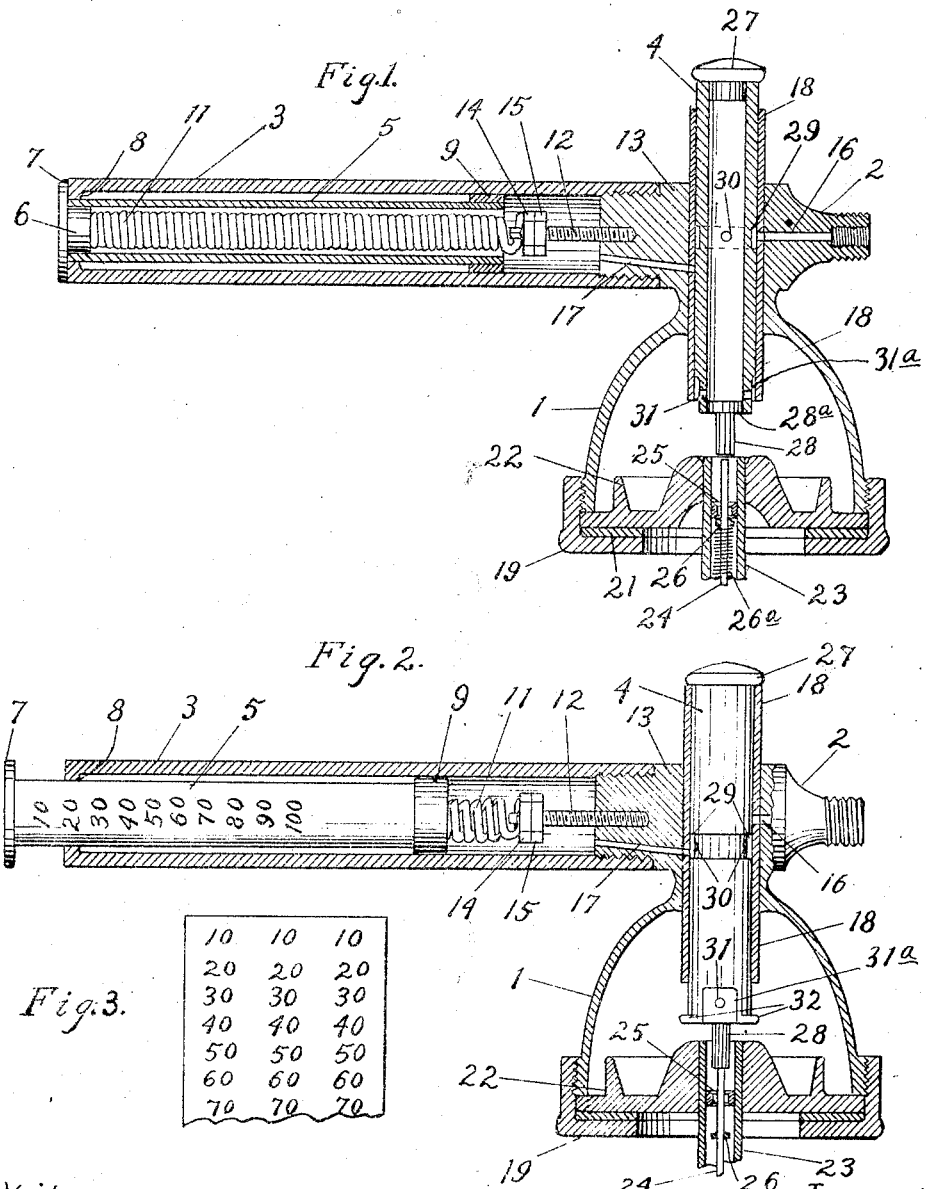

DAVIS BARNARD, OF LOS ANGELES, CALIFORNIA, ASSIGNOR TO BARNARD SPECIALTY COMPANY, OF LOS ANGELES, CALIFORNIA, A CORPORATION OF CALIFORNIA.

COMBINATION PRESSURE-GAGE AND PUMP CONNECTION FOR PNEUMATIC TIRES.

986,672.

Specification of Letters Patent. Patented Mar. 14, 1911.

Application filed October 7, 1909. Serial No. 521,540.

*To all whom it may concern:*

Be it known that I, DAVIS BARNARD, a citizen of the United States, and resident of the city of Los Angeles, State of California, have invented a new and useful Combination Pressure-Gage and Pump Connection for Pneumatic Tires, of which the following is a specification.

Among the objects of this invention are to provide an air gage which is an improvement upon existing gages in respect to displaying the indicating numerals in a more conspicuous manner; in being supplied with an improved plunger against which the air pressure operates; and an improved arrangement of the spring against which the air pressure is opposed when the gage is operated, to lengthen the life of said spring and improve its function.

Another object of the invention is to provide an appliance which combines the functions of a pressure gage and air pump connection in an improved manner.

Still other objects such as compactness and simplicity of construction and ease of operation may hereinafter appear.

Still another object is to provide a more accurate gage of the spring controlled type, and one that can be used a long time before the spring will need adjusting, and can be easily adjusted when necessary.

The appliance can be used as a pressure gage either when attached to the pump or when disconnected therefrom.

This invention is regarded as being an improvement over other devices of its class in respect to the provision of a longitudinally movable valve plunger adapted to protect the gage by excluding therefrom, while the tire is being inflated, the high air pressures of reservoirs from which automobile tires are frequently supplied. This plunger valve has the further advantage of being longitudinally slidable so that the end of the plunger itself may be used to unseat the tire valve by direct contact therewith. So far as I am aware, the two useful features just mentioned have not hitherto been combined in a single valve.

The invention consists in the various parts, combinations of parts, and details of construction, described in connection with the accompanying drawings and then more definitely pointed out in specific and generic claims.

Referring to the accompanying drawings which illustrate the invention, Figure 1, is a longitudinal mid-section of the entire appliance showing also a portion of a tire valve, and illustrating the appliance in position for conducting air from the pump to the tire. Fig. 2 is a similar section except that some of the interior parts are left unsectioned and the valve plunger is shown in position for conducting air from the tire to the pressure gage. Fig. 3 is view showing the surface of the indicating plunger projected to illustrate the arrangement of the indicating numerals thereon.

Referring in detail to the drawings, the appliance consists of the valve connection or coupling member 1, the pump connection 2, the gage proper provided with a housing 3, and the plunger or valve 4.

Referring first to the construction of the gage proper, within the housing 3 is fitted a hollow piston plunger 5 the outer end of which is desirably closed by a cap 6 having a flange 7, said flange coöperating with the outer end of the housing 3 to constitute stop means to limit the inward movement of the piston plunger 5. In order to provide a smooth fit between the plunger 5 and housing 3 the outer end of said housing may be provided with an interior flange 8 and the internal end of the plunger 5 have shrunk or turned thereon a ring 9 adapted to fit within the housing 3. To the inside of cap 6 is fastened by soldering or otherwise the tension spring 11 within the plunger 5, said tension spring being made fast at its other end to a threaded pin 12 screwed into the body 13. The means of attachment of the spring 11 to the pin 12 may consist of a nut 14 screwed on to the end of the pin 12, the spring 11 being soldered or otherwise fastened to said nut, and the lock nut 15 being employed to secure the nut 14 in adjusted position.

The body 13 is provided with passages to afford communication between a tire and a pump and the housing 3. The movement of the air through these passages is controlled by the plunger or valve 4. Said passages may consist of an intake passage 16 through which the air can enter from the pump to the bore through the body 13 within which the plunger 4 is fitted; a gage-supplying passage 17 leading from said bore at a different point in the length thereof to the interior of the gage to supply air thereto; and a passage through the sleeve 18 and lower portion of the plunger 4 for conducting the air from the pump to the tire, and in certain cases from the tire to the pressure gage as will hereinafter be more fully described.

In the drawings coupling member 1 is illustrated as provided with a cap 19 screwed upon said member and clamping the washer 21 against the rubber member 22 to form an air-tight fitting, but it is to be understood that any well-known means may be employed for making the connection with the tire.

In Fig. 1, 23 designates a nipple of the tire valve, 24 the stem of the valve, 25 the valve seat, and 26 the closure or valve proper. 26ª is the valve spring.

The plunger 4 desirably consists of a tube the upper end of which is closed by a cap 27 and from the lower end of which projects a pin 28 adapted to unseat the valve stem 24 when the plunger is depressed. Said tubular plunger 4 is girdled by a groove or channel 29 the plunger being longitudinally movable to bring said channel into register with the passage 16 leading from the pump or passage 17 leading to the gage. One or more holes 30 lead from the interior of the plunger through the wall thereof to the channel 29. Near the lower end of the plunger one or more holes 31 lead out from the interior of the plunger to afford communication with the air within the member 1. The lower end of the plunger 4 is cut away at 31ª opposite each hole 31 to permit the air to enter said holes 31 when the plunger is drawn up into the tube 18. As seen in Fig. 2 the lower end of the plunger 18, where not cut away as just stated is provided with a bead or external flange 32 which coöperates with the lower end of the tube 18 to form stop means to prevent the complete withdrawal of the plunger. The pin 28 may be provided with a head 28ª which is soldered or otherwise fastened within the lower end of the valve plunger 4.

It will be seen that the plunger 4, in addition to its function as a valve, forms a convenient means for unseating the tire valve. In one up and down movement or cycle said plunger 4 therefore performs the three functions of putting the pump connection and pressure gage singly into communication with the tire valve, and of depressing the valve stem 24.

The indicating plunger is desirably provided with three rows of numerals so that the amount of pressure can be read off from the same whichever side comes nearest the operator.

When the device is coupled onto the tire valve to inflate the tire (not shown) the valve spring 26ª will tend to lift the plunger 4 nearly to the position of Fig. 1 so that the groove 29 will be brought into register with the inlet passage 16 and air will pass from the pump (not shown) into the member 1 through valve nipple 23 into the tire, the gage being cut off from the pump. Then the air pressure will force the plunger 4 up until the flange 32 strikes against the lower end of sleeve 18. To put the gage into communication with the tire, it is only necessary to depress the plunger 4 to the position of Fig. 2.

I claim:

1. In combination, a pressure gage, a body having a bore therein, a plunger extending slidably through said bore, said plunger being provided with a passage therethrough to conduct air from a pump to a tire, a pump connection with which said passage communicates in one position of said plunger, a pressure gage with which said passage communicates in another position of said plunger, and means for putting said passage into communication with a tire.

2. In combination, a pressure gage, a body having a bore therein, a hollow plunger slidably fitting said bore, said plunger being provided with a groove girdling the same and a hole leading from said groove to the interior of the plunger and with an additional inlet leading into the plunger at a point spaced away from said hole and groove, an air inlet to communicate with a pump, an air outlet to communicate with said gage, and means for putting said additional inlet into communication with a tire, said plunger being slidable to move said groove out of communication with said pump inlet and into communication with the inlet leading to the gage, and vice versa.

3. The combination with a gage proper, tire valve connection, and pump connection; of a longitudinally movable valve plunger to open and close communication with said gage, the end of said plunger being adapted to automatically unseat the tire valve when moved into position to supply air from the tire to the gage, said plunger being adapted to open communication with said pump connection when moved in the reverse direction.

4. In combination a body, a sleeve extending through said body, a hollow plunger slidably fitted within said sleeve, a shoulder carried by said plunger at each end thereof to limit the movement of said plunger within said sleeve, said plunger being girdled by a groove and having a hole leading from said groove to the interior thereof, there being a passage which leads through said body and sleeve to said groove when said plunger is at one limit of its travel and another passage which leads through said body and sleeve to said groove when said plunger is at the other limit of its travel, a pump connection to which one of said passages leads, a pressure gage to which the other passage leads, and means adapted to put the interior of said plunger into communication with the interior of a pneumatic tire.

5. In combination, a pressure gage, a pump connection, a tire valve connection, and a plunger valve adapted to be moved longitudinally to put the pump connection and pressure gage singly into communication with said tire valve, the end of said plunger being adapted to move against the tire valve to unseat the same.

In testimony whereof I have hereunto signed my name in the presence of two subscribing witnesses at Los Angeles, in the county of Los Angeles and State of California, this 29th day of September, 1909.

DAVIS BARNARD.

Witnesses:
 W. S. LYSLE,
 ALBERT H. MERRILL.